United States Patent [19]

Crabb

[11] 3,899,938

[45] Aug. 19, 1975

[54] PLANETARY TORQUE PROPORTIONAL DIFFERENTIAL

[75] Inventor: Elmer R. Crabb, Pekin, Ill.

[73] Assignee: Caterpillar Tractor Company, Peoria, Ill.

[22] Filed: May 8, 1974

[21] Appl. No.: 468,014

[52] U.S. Cl. .............................. 74/710.5; 74/714
[51] Int. Cl.² ...................... F16H 1/44; F16H 1/42
[58] Field of Search .......... 74/710.5, 711, 713, 714, 74/705

[56] References Cited
UNITED STATES PATENTS

| | | | |
|---|---|---|---|
| 2,913,928 | 11/1959 | Double | 74/710.5 |
| 3,323,389 | 6/1967 | Hause | 74/710.5 |
| 3,383,950 | 5/1968 | Kershner | 74/710.5 |
| 3,446,320 | 5/1969 | Schott | 74/710.5 X |
| 3,605,523 | 9/1971 | O'Brien | 74/711 |
| 3,627,072 | 12/1971 | Smirl | 74/711 X |
| 3,748,928 | 7/1973 | Shiber | 74/711 |
| 3,814,222 | 6/1974 | Koivunen | 74/710.5 X |

*Primary Examiner*—Samuel Scott
*Assistant Examiner*—Lance W. Chandler
*Attorney, Agent, or Firm*—Phillips, Moore, Weissenberger Lempio & Strabala

[57] ABSTRACT

The invention provides a torque transfer system for a two axle vehicle including a planetary torque proportioning differential for proportioning input torque between first and second coaxially disposed, relatively rotatable output shafts which are operatively connected to the first and second axles, respectively. The differential includes a planet gear system which imparts input torque received from an input carrier gear to the second output shaft via an associated ring gear and to the first output shaft via an integral sun gear. The differential further includes piston-actuated clutch means for permitting engagement of the input carrier gear with the first output shaft while the vehicle is in motion, thereby preventing relative rotation between the first and second output shafts and providing means for transferring torque to a high-traction axle when the opposing axle has lost traction.

9 Claims, 1 Drawing Figure

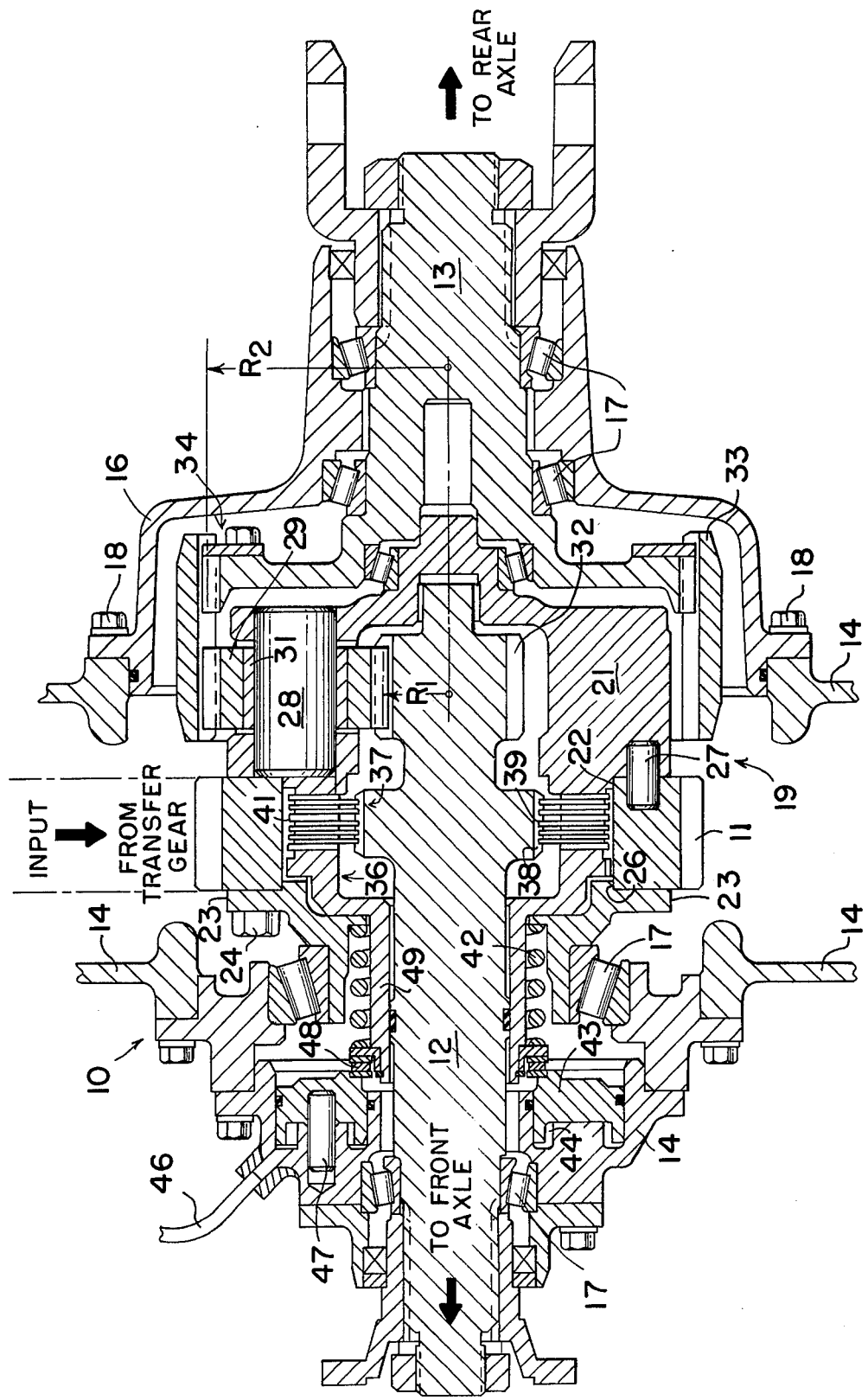

PLANETARY TORQUE PROPORTIONAL DIFFERENTIAL

BACKGROUND OF THE INVENTION

This invention relates to a torque transfer system for a vehicle having two drive axles. In particular, the invention relates to a torque transfer system including differential means for proportioning driving torque between the front and rear axles of the vehicle according to the varying torque demands thereupon.

It is well recognized in the art that the traction effort of a vehicle having a four-wheel drive system can be substantially improved if driving torque is applied to more than one axle. However, certain problems have arisen in connection with such drive systems which have limited their application or have resulted in undesirable side effects such as rapid wear of certain vehicle parts or excessive fuel consumption. For example, if all four wheels of a vehicle are positively driven, severe tire scraping can occur as the vehicle negotiates curves or turns about its rear axle. Under these conditions, the front wheels must run through an arc of greater radius than that of the rear wheels, and therefore must rotate faster than the rear wheels. Also, slight differences in wheel radii due to inevitable differences in tire inflation, tread wear, or variations in loading, can result in what is known as circumferential scrub. Such condition occurs when the wheels having the smaller radii tend to rotate faster than those having the larger radii while traversing the same distance. If the front and rear wheels are positively driven together at the same angular speed, then on turning the wheels having the smaller radii will be badly scraped over the ground surface.

A number of means have been proposed for obviating such results such as the differential and torque transfer means described in U.S. Pat. Nos. 3,457,807; 2,667,087; 3,494,226; 3,648,545; 3,650,349; and 3,706,350, issued respectively on July 29, 1969 to Altmann; on Jan. 26, 1954 to Myers; on Feb. 10, 1970 to Biddle; on Mar. 14, 1972 to Clancey; on Mar. 21, 1972 to Cleveland, et al; and on Dec. 19, 1972 to Bokovoy.

While many of the prior art differential means have obviated some of the above-described disadvantages, they have frequently caused other problems. For example, a differential system which permits overspeeding of one or more wheels of the vehicle during rounding of a corner or when differences in wheel radii are extant, typically also permits free-wheeling of a wheel on encountering, for example, a slippery or icy patch of ground. Under these conditions, such a differential will prevent the other wheels from exerting driving torque. It is, therefore, desirable to provide differential means which include means for transferring driving torque as required by operating conditions, while improving the traction characteristics of the vehicle without creating undue stresses formation in the vehicle drive system.

SUMMARY AND OBJECTS OF THE INVENTION

The invention provides a torque transfer system for a two-axle drive vehicle including differential means comprising a planetary torque differential for proportioning torque between the front and rear axles according to existing traction requirements.

The planetary differential means of this invention is bi-directional and includes a plurality of planet gears, each of which engage a sun gear integrally formed with a first output shaft with a first output shaft associated with a front vehicle axle assembly, and each of which also engages a ring gear secured to a second output shaft associated with a rear vehicle axle assembly. Torque is delivered to the planet gears from an input gear driven by a vehicle transfer gear train, and is proportionally transmitted to the front and rear axle assemblies via the output shafts according to the configuration of the sun and ring gears, which control the relative rotational speeds of the output shafts.

The differential means of the invention further include manually actuatable disc clutch means for effecting engagement of the output shafts with each other while the vehicle is in motion, and for thereby preventing relative rotation between these shafts so that torque may be transmitted to a high-traction axle when the opposing axle has lost traction. The clutch means is adjusted to slip at a predetermined torque to restore the differential function and eliminate high torque feedback from the front axle while maneuvering, thereby avoiding potential damage to the front drive components of the vehicle.

Accordingly, it is an object of this invention to provide means for proportioning driving torque between the front and rear axles of a vehicle.

It is another object of this invention to provide differential means for a two-axle vehicle including means for proportioning driving torque between the front and rear axles and for transferring torque to a high-traction axle when the other axle has lost traction.

A further object of this invention is to provide a torque-proportioning differential means including clutch means for effecting engagement of elements of the differential means in response to existing traction requirements while the vehicle is in motion, and for effecting disengagement of these elements when a predetermined torque is exceeded.

Yet another object of this invention is to provide means for avoiding damage to front drive components and tires resulting from an undesired uniform angular wheel speed in both front and rear axles in conjunction with means for responding to vehicle traction requirements.

Further objects and advantages of the invention will become apparent from the following descriptions and drawing.

BRIEF DESCRIPTION OF THE DRAWING

The sole FIGURE is a sectional view of the present torque transfer system for a two-axle vehicle torque proportioning differential means.

DETAILED DESCRIPTION

The illustrated torque transfer system includes a differential means, generally indicated at 10, a rotatable input gear 11 driven by a vehicle transfer gear train (not shown), a first output shaft 12 operatively connected to the front axle (not shown) of a vehicle, and a second output shaft 13 operatively connected to the rear axle (not shown) of the vehicle and coaxially disposed with respect to the first output shaft 12 to permit relative rotation therebetween. The differential means 10 is supported in stationary housings 14 and 16 by a plurality of bearings 17. The housing 16 is disposed within the housing 14 and secured thereto as by bolts 18.

The differential means 10 includes a carrier assembly 19 comprising a rotatable carrier member 21 disposed on a portion 22 of the input gear 11 and secured to a support adapter 23 as by bolts 24. The adapter 23 also supports the input gear 11 on an inner circumferential portion 26 thereof. Input torque from the input gear 11 is transmitted to the carrier member 21 through multiple pin means 27, only one of which is shown.

The carrier assembly 19 further comprises a plurality of planet gear shafts 28, one shown, which, together with the carrier member 21, support a corresponding plurality of planet gears 29 upon bearings 31. The planet gears impart a tangential force to a sun gear 32 integral with the first output shaft 12, and a ring gear 33 which is secured to the second output shaft 13, as by a split plate and bolt assembly 34. This arrangement permits the two shafts to rotate at different speeds to proportion the input torque delivered by the input gear 11 between the front and rear axles according to the number of teeth in the sun gear 32 and the ring gear 33 and according to the pitch radius of the sun gear ($R_1$) and the pitch radius of the ring gear ($R_2$). Such torque proportions may be regulated by varying the described parameters, if desired.

The differential means 10 further includes clutch means 36 for permitting engagement of the carrier assembly 19 with the first output shaft 12 while the vehicle is in motion to prevent relative rotation between the output shafts 12 and 13 and to provide traction to the high-traction axle when the other axle has lost traction.

The clutch means 36 includes a disc clutch pack 37 disposed between the carrier assembly 19 and the first output shaft 12. The clutch pack is carried upon a pair of splines 38 and comprises alternating plates 39 splined to the front output shaft and discs 41 splined to the input gear 11 so that drive torque is transmitted from the gear 11 to the shaft 12 upon the application of sufficient axial force to the pack of discs and plates to prevent relative movement thereof. The clutch means 36 further include a clutch release spring 42 seated between the adapter 23 and a piston 43. The spring is compressed upon rightward movement of the axially reciprocal piston 43 which is annularly disposed about the front output shaft 12 to selectively engage the clutch. When a locked traction operation is required the piston 43 is actuated rightwardly by means of the application of pressure in a chamber 44 defined by the piston 43 and the housing 14. Conveniently, pressure may be communicated to this chamber upon actuation of a manually operated on-off valve means (not shown) for directing air or other pressure fluid through a conduit 46 communicating with the chamber. Rightward movement of the piston 43 is guided by means of a dowel 47 through a roller thrust bearing 48 and a piston sleeve portion 49.

In operation, the clutch means 36 is normally disengaged to permit the differential means to function to permit relative rotation between the front and rear output shafts and thus, permit different angular speeds between the front and rear wheels. When traction demands require, for example, when the rear wheels of the vehicle lose traction, the clutch means 36 may be engaged by the vehicle operator by admitting pressure fluid to the chamber 44 to actuate the piston 43 rightwardly and compress the clutch release spring 42 to cause the clutch plates 39 to engage the discs 41, thereby locking the front output shaft 12 and the input gear 11. In this condition, the sun gear 32 will drive the planet gears 29 and ring gear 33 which is connected to the rear shaft 13.

Relative rotation between the front output shaft 12 and the rear output shaft 13 will be prevented, and torque will be transferred to the axle in which traction has been lost. The clutch is designed to slip at a predetermined torque exerted thereupon to eliminate high torque feedback and component damage while maneuvering.

It may be seen that the invention provides superior means for substantially eliminating front drive component stresses and tire damage occasioned by uniform angular wheel speed in a multi-axle vehicle. At the same time the invention provides means for transferring torque from one axle to another as required by traction conditions. Although the invention has been described with respect to a particular embodiment, it should be apparent that equivalent embodiments are possible within the spirit of the inventive concepts and no limitations are intended except by the scope of the appended claims.

I claim:

1. A torque transfer system for a vehicle having first and second drive axles comprising; first output shaft means for transmitting drive torque to said first axle, second output shaft means for transmitting drive torque to said second axle, said second output shaft means being disposed coaxially with respect to said first output shaft means, first input means for transmitting torque from an external source to said torque transfer system, differential gear means for selectively transmitting torque to said first and second output shaft means to normally concurrently rotate each of said output shaft means at a different angular speed, manually actuated clutch means for selectively overriding said differential gear means and locking said first and second output shaft means together for concurrent rotation of said first output shaft means and said second output shaft means at the same angular speed, said manually actuated clutch means, when actuated, permitting the rotation of said first and second drive axles of said vehicle.

2. The invention of claim 1 wherein said differential gear means include first ring gear means splined directly to said second output shaft means for positive rotation therewith.

3. The invention of claim 2 wherein said differential gear means include a plurality of planet gears engaging said first ring gear means and planetating thereabout.

4. The invention of claim 3 wherein said differential gear means further include sun gear means for constantly engaging said planet gears, said sun gear means being formed upon said first output shaft means for direct rotation therewith.

5. The invention of claim 4 wherein said first input means include second ring gear means having first internal spline means thereupon, said differential gear means further including a carrier member for said plurality of planet gears, said carrier member being pinned for constant rotation with said second ring gear means.

6. The invention of claim 5 wherein said first output shaft means include second external spline means thereupon, said manually actuated clutch means including a plurality of clutch discs splined to said second external spline means for constant rotation with said first output shaft means, said clutch means further including a plurality of clutch plates splined to said first internal spline means of said second ring gear means for constant rotation therewith.

7. The invention of claim 6 wherein said clutch means further include actuating piston means for selectively applying axial force to said plates and discs to cause concurrent rotation of said plates and discs.

8. The invention of claim 7 wherein said clutch means includes chamber means for selectively receiving fluid under pressure to cause axial movement of said actuating piston means.

9. The invention of claim 8 wherein said clutch means include mechanical spring means for causing said discs to move out of engagement with said plates upon release of pressure fluid from said chamber means.

* * * * *

Disclaimer 3,899,938.—*Elmer R. Crabb*, Pekin, Ill. PLANETARY TORQUE PROPORTIONAL DIFFERENTIAL. Patent dated Aug. 19, 1975. Disclaimer filed Nov. 11, 1976, by the assignee, *Caterpillar Tractor Co.*
Hereby enters this disclaimer to claim 1 of said patent.
[*Official Gazette March 8, 1977.*]